United States Patent
Ratasuk et al.

(10) Patent No.: US 11,902,879 B2
(45) Date of Patent: Feb. 13, 2024

(54) METHOD FOR STANDALONE MTC OPERATION

(71) Applicant: Nokia Technologies Oy, Espoo (FI)

(72) Inventors: Rapeepat Ratasuk, Hoffman Estates, IL (US); Matthew Baker, Cambridge (GB); Nitin Mangalvedhe, Hoffman Estates, IL (US); David Bhatoolaul, Swindon (GB); Chunhai Yao, Beijing (CN)

(73) Assignee: Nokia Technologies Oy, Espoo (FI)

(*) Notice: Subject to any disclaimer, the term of this patent is extended or adjusted under 35 U.S.C. 154(b) by 493 days.

(21) Appl. No.: 17/263,646

(22) PCT Filed: Aug. 2, 2018

(86) PCT No.: PCT/CN2018/098328
§ 371 (c)(1),
(2) Date: Jan. 27, 2021

(87) PCT Pub. No.: WO2020/024219
PCT Pub. Date: Feb. 6, 2020

(65) Prior Publication Data
US 2021/0314851 A1    Oct. 7, 2021

(51) Int. Cl.
*H04W 48/10*       (2009.01)
*H04W 72/04*       (2023.01)
(Continued)

(52) U.S. Cl.
CPC ........... *H04W 48/10* (2013.01); *H04L 5/0048* (2013.01); *H04W 48/12* (2013.01); *H04W 72/04* (2013.01)

(58) Field of Classification Search
CPC ..... H04W 48/10; H04W 48/12; H04W 72/04; H04L 5/0048
(Continued)

(56) References Cited

U.S. PATENT DOCUMENTS

2014/0098761 A1    4/2014   Lee et al. ................. 370/329
2016/0037514 A1*   2/2016   Xiong ..................... H04W 4/70
                                                             370/336
(Continued)

FOREIGN PATENT DOCUMENTS

CN     103748823 A    4/2014
CN     104936133 A    9/2015
(Continued)

OTHER PUBLICATIONS

"Reserved resources for supporting NR coexistence with eMTC and NB-IoT", Sony, 3GPP TSG RAN WG1 Meeting #90, R1-1712979, Aug. 2017, 5 pages.
(Continued)

*Primary Examiner* — Faisal Choudhury
(74) *Attorney, Agent, or Firm* — Harrington & Smith

(57) ABSTRACT

Method, apparatus and computer program product where a base station broadcasts a signal indicating that at least one time-frequency region, which is unused by a data transmission in a first radio access technology, is available for a transmission, allowing the base station to maintain support for and/or extending coverage of certain legacy user equipment. Such a transmission includes system information for
(Continued)

a second radio access technology, wake-up signal, synchronization signal, and/or extension of the data transmission. Thereafter, the base station transmits such a transmission in the at least one time-frequency region that was indicated.

20 Claims, 7 Drawing Sheets

(51) Int. Cl.
*H04L 5/00* (2006.01)
*H04W 48/12* (2009.01)

(58) Field of Classification Search
USPC .......................................................... 370/330
See application file for complete search history.

(56) References Cited

U.S. PATENT DOCUMENTS

| | | | |
|---|---|---|---|
| 2016/0309282 A1* | 10/2016 | Xu | ........................ H04W 4/70 |
| 2017/0207924 A1 | 7/2017 | Lee et al. | |
| 2017/0273078 A1 | 9/2017 | Rico Alvarino et al. | ....... 72/446 |
| 2017/0311285 A1 | 10/2017 | Ly et al. | |
| 2017/0353946 A1 | 12/2017 | Rico Alvarino et al. | ........... 72/5 |
| 2020/0029302 A1* | 1/2020 | Cox | .................. H04W 56/0015 |

FOREIGN PATENT DOCUMENTS

| | | |
|---|---|---|
| CN | 106685607 A | 5/2017 |
| CN | 106717090 A | 5/2017 |
| CN | 107735979 A | 2/2018 |
| WO | WO 2016/018526 A1 | 2/2016 |
| WO | WO 2017/052459 A1 | 3/2017 |
| WO | WO-2017/136666 A1 | 8/2017 |
| WO | WO-2018/059189 A1 | 4/2018 |
| WO | WO-2018/083660 A1 | 5/2018 |

OTHER PUBLICATIONS

"NR and LTE Coexistence", Ericsson, 3GPP TSG-RAN WG1 NR ad Hock #3, R1-1716532, Sep. 2017, 6 pages.
"Wake Up Signal Configuration for NB-IoT", Media Tek Inc. 3GPP TSG RAN WG1 Meeting #92bis, R1-1804139, Apr. 2018, 7 pages.
"Further NB-IoT enhancements", Webb, Matthew, et al., 3GPP TSG RAN meeting #80, RP180849, Jun. 2018, 36 pages.
"Reserved resources for NR coexistence with eMTC", Sony, 3GPP TSG RAN1#90bis, R1-1718661, Oct. 2017, 5 pages.

* cited by examiner

FIG. 4: Block diagram of the "spatial synthesis".

FIG. 5: Block diagram of the "positioning" block.

METHOD FOR STANDALONE MTC OPERATION

CROSS REFERENCE TO RELATED APPLICATION

This patent application is a U.S. National Stage application of International Patent Application Number PCT/CN2018/098328 filed Aug. 2, 2018, which is hereby incorporated by reference in its entirety.

TECHNICAL FIELD

This invention relates generally to enhanced Machine Type Communication (eMTC) and, particular, to maintaining support and extending coverage for eMTC user equipment.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

Currently (Rel-15 and prior), eMTC can only be transmitted or deployed in-band within an LTE carrier. In this case, the first N OFDM symbols are reserved for legacy PDCCH transmission which is not used by eMTC. Furthermore, eMTC operates on a narrowband concept, which may not use all available PRBs in different allowable bandwidths. This reduces eMTC efficiency and may result in resource waste.

It is expected that eMTC UEs will be around for a long time (e.g. water/power meters can have a lifetime of 10-15 years or more). As LTE systems are re-farmed to NR, there would be no need to support broadband LTE UEs. However, since eMTC LTE UEs would still need to be supported, the current invention moves beyond current techniques in order to maintain support for eMTC user equipment (UE).

Acronyms or abbreviations that may be found in the specification and/or the drawing figures are defined within the context of this disclosure or as follows below:
3GPP Third Generation Partnership Project
5G $5^{th}$ Generation
BR Bandwidth reduced Low complexity
BS Base Station
CE Coverage Enhancement
CEMode A Coverage extension mode A
CEMode B Coverage extension mode B
CORESET Control Resource Set
CRS Cell-specific Reference Signal
DCI Downlink Control Information
DL Downlink
DMRS DeModulation Reference Signal'
eMTC enhanced Machine Type Communication
eNB or eNodeB base station, evolved Node B
gNB NR/5G Node B
HARQ Hybrid Automatic Repeat Request
ID Identity or Identification
IMT International Mobile Telecommunications (4, 4.5, or 5G)
IP Internet Protocol
IoT Internet of Things
LTE Long Term Evolution
LTE-A Long Term Evolution—Advanced
MIB Master Information Block (information broadcasted by the eNB irrespective of UE presence; first amongst the other SIB broadcasted)
MME Mobility Management Entity
MPDCCH MTC Physical Downlink Control Channel (a special type of PDCCH designed for bandwidth-reduced operation)
MSG Message
MTC Machine-Type Communications
N a Number of, quantity of, or amount of
NB Narrowband
NR New Radio (5G)
OFDM Orthogonal Frequency Division Multiplexing
PBCH Physical Broadcast Channel
PRB Physical Resource Block
PDSCH Physical Downlink Shared Channel
PUSCH Physical Uplink Shared Channel
PRACH Physical Random Access Channel
PSS Primary Synchronization Signal
RAR Random Access Response
RA-RNTI Random Access Radio Network Temporary Identifier
RB Resource Block
Rel Release
RE Resource Element
RS Reference Signal
RRC Radio Resource Control
Rx Receive, Reception, or Receiver
SIB System Information Block
SIB1 System Information Block Type 1
SSB Synchronization Signal Block (Synchronization/PBCH Block since Synchronization signal and PBCH channel are packed as a single block that always move together)
SSS Secondary Synchronization Signal
TS Technical Specification
Tx Transmit, Transmission, or Transmitter
UE User Equipment
UL Uplink

BRIEF SUMMARY

This section is intended to include examples and is not intended to be limiting. The word "exemplary" as used herein means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

An exemplary embodiment of the present invention broadcasting a signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; transmitting, by the base station, the transmission in the at least one time-frequency region.

Another exemplary embodiment of the present invention is a method comprising: receiving by a UE a broadcast signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; receiving, by the UE, the transmission in the at least one time-frequency region.

Another exemplary embodiment of the present invention is an apparatus comprising: at least one processor and at least one memory including computer program code, wherein the at least one memory and the computer code are configured, with the at least one processor, to cause the apparatus to at least perform the following: broadcasting a signal indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; transmitting the transmission in the at least one time-frequency region.

Another exemplary embodiment of the present invention is a computer program comprising code for broadcasting a signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; and code for transmitting, by the base station, the transmission in the at least one time-frequency region.

Another exemplary embodiment of the present invention is an apparatus comprising means for broadcasting a signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; and means for transmitting, by the base station, the transmission in the at least one time-frequency region.

DETAILED DESCRIPTION OF THE DRAWINGS

Figure 1:
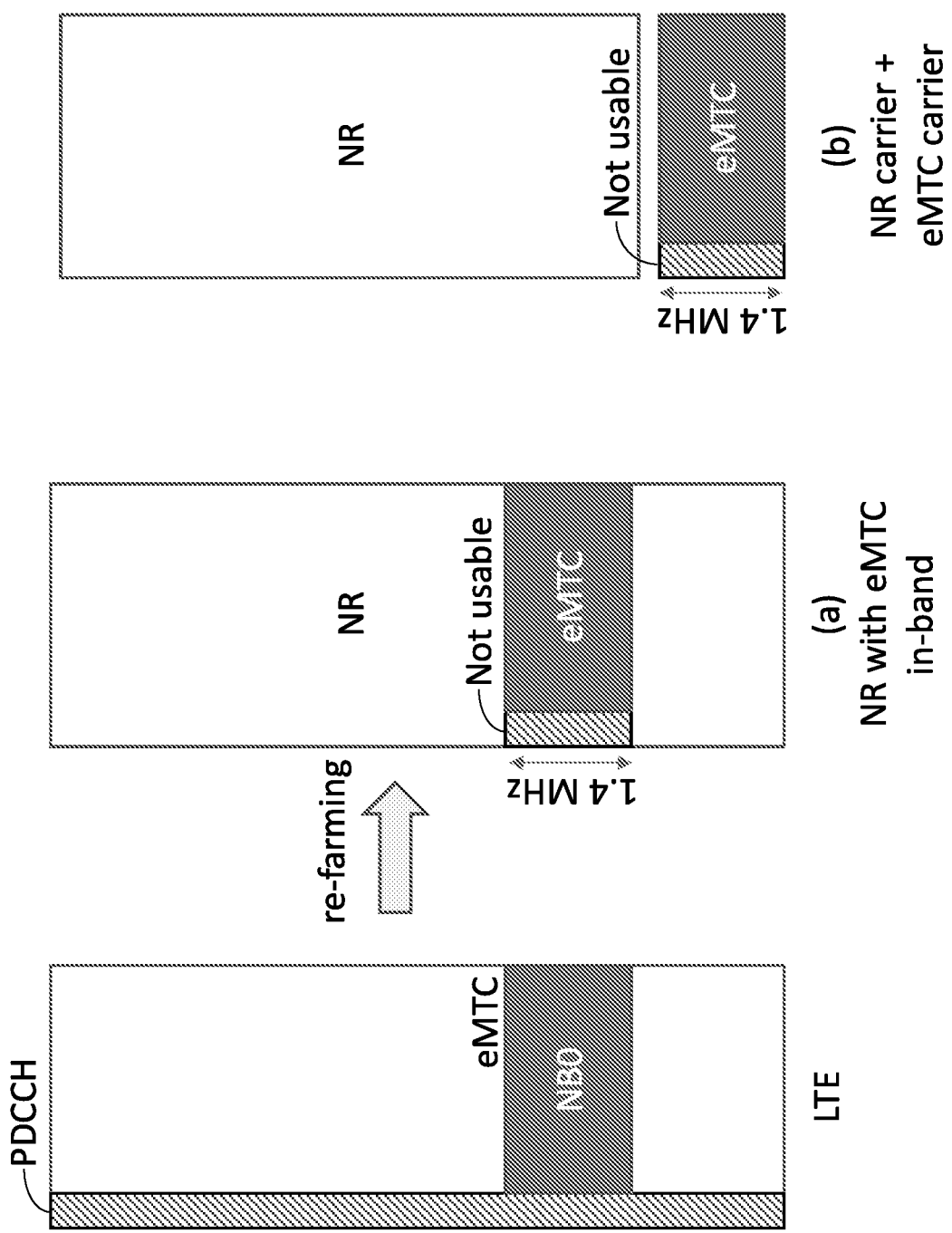
FIG. 1 depicts re-farming of LTE spectrum to (a) NR with eMTC carrier in-band and (b) separate NR and eMTC carriers, where 1 narrowband is needed for eMTC.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Currently (Rel-15 and prior), eMTC can only be transmitted or deployed in-band within an LTE carrier. The first N OFDM symbols are reserved for legacy PDCCH transmission which is not used by eMTC. Furthermore, eMTC operates on a narrowband concept, which may not use all available PRBs in different allowable bandwidths. This may result in resource waste.

It is expected that eMTC UEs have to be supported for a longer than LTE UEs, as LTE systems are re-farmed to NR and there is no need to support LTE UEs.

When LTE carriers are re-farmed for NR, not all available PRBs in different allowable bandwidths will be able to be used for eMTC. For instance in case two narrowband carriers are needed for eMTC with a bandwidth of 1.4 MHz, the first N OFDM symbols as well as 3 additional PRBs remain unusable for eMTC carriers due to legacy design.

A goal of the current invention is to increase the eMTC efficiency. In line with this goal, the invention seeks to re-use all available time resources for UEs of Rel-16 and beyond while minimizing impact to legacy eMTC UEs, to support switching between NR and eMTC for NR-IoT dual-mode UE, and to minimize resource waste while maintaining the expected coverage and performance for legacy eMTC UEs.

Instead of simply re-using the first N OFDM symbols for NPDCCH and NPDSCH, the invention proposes transmitting Rel-16 information as SIB-NR, enhanced wake up signal, or enhanced synchronization signal. In this way, new functionality can be introduced without any impact to legacy UEs or system performance.

As such, an embodiment of the present invention is a method for stand-alone eMTC deployment, including following main steps:

eNB will broadcast in eMTC System Information Block (SIB1-BR) whether the unused symbols (e.g. reserved symbols (for instance, for the LTE control region, for interference coordination, for co-existence with other radio technologies, etc), symbols that have been marked as invalid, or symbols that are reserved for legacy radio technologies (where legacy radio technologies refer to those for Rel-15 and prior releases)) and PRBs are available for use by Rel-16 UE. They can be used for SIB-NR, enhanced wake-up signal, enhanced synchronization signals, or MPDCCH/PDSCH extension. A bitmap can be used to broadcast which subframes/symbols/PRBs are reserved for specific purposes.

A new SIB containing NR-related information (SIB-NR) will be introduced and can be transmitted on this unused time-frequency region. SIB-NR may contain NR assistance information and NR coexistence information.

On time-frequency regions without SIB-NR, an enhanced wake-up signal can be transmitted, or an enhanced synchronization signal, i.e., PSS, SSS, can be transmitted. MPDCCH or PDSCH or SIB will be extended to occupy the first N OFDM symbols.

Note that NB-IoT uses the unusable OFDM symbols to extend the NPDCCH & NPDSCH, that NB-IoT in stand-alone mode has NPDCCH and NPDSCH start from the first OFDM symbols, and that NB-IoT for in-band deployment mode NPDCCH and NPDSCH start from the Nth OFDM symbol.

This cannot be used in eMTC because eMTC will also need to support legacy UEs that cannot use the first N OFDM symbols. The present invention proposes to use unusable OFDM symbols and PRBs to transmit Rel-16 information only related to Rel-16 UE and transmitted on a region that only Rel-16 UE can use, which minimizes the impact to legacy eMTC UEs.

With this invention report a method for stand-alone eMTC deployment is proposed. An eNB in eMTC will broadcast a System Information Block (SIB1-BR) indicating whether the unused symbols and PRBs are available for use by Rel-16 UE. They can be used for SIB-NR, enhanced wake-up signal, enhanced synchronization signals, or MPDCCH/PDSCH extension. A bitmap can be used to broadcast which subframes/symbols/PRBs are reserved for which purpose.

A new SIB containing NR-related information (SIB-NR) will be introduced and can be transmitted on this unused time-frequency region. SIB-NR may contain NR assistance information and NR coexistence information. On time-frequency regions without SIB-NR, an enhanced wake-up signal can be transmitted and/or an enhanced synchronization signal, i.e., PSS, SSS, can be transmitted. MPDCCH or PDSCH or SIB will be extended to occupy the first N OFDM symbols.

Figure 2:
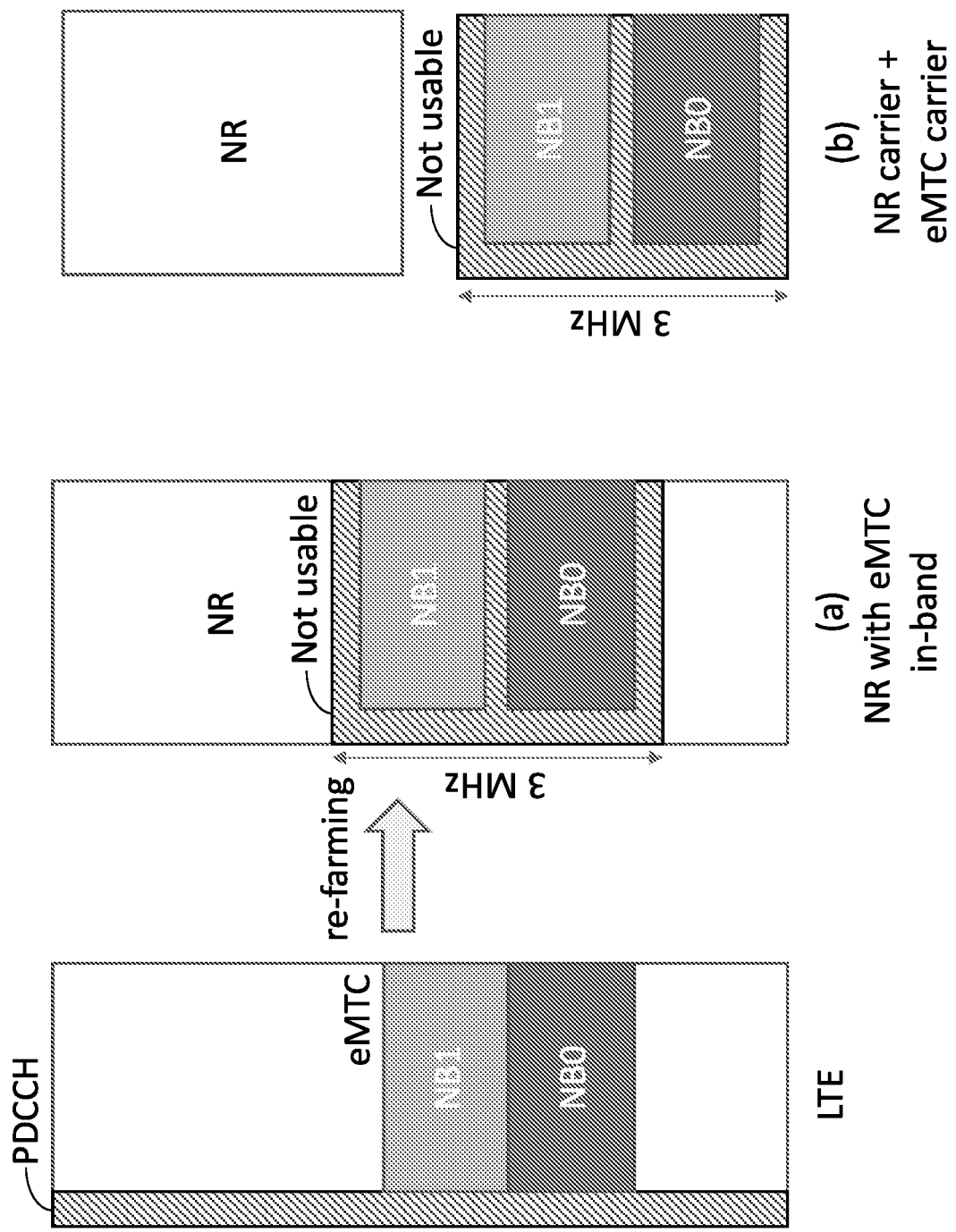
FIG. 2 depicts re-farming of LTE spectrum to NR with eMTC carrier in-band and (b) separate NR and eMTC carriers, where 2 narrowbands are needed for eMTC.

As shown in FIG. 1 and FIG. 2, for continued support of eMTC UEs, an eMTC carrier could be deployed as a separate carrier or within an NR carrier.

FIG. 1 depicts re-farming the LTE spectrum to (a) NR with eMTC carrier in-band and (b) separate NR and eMTC carriers, where 1 narrowband is needed for eMTC. Only 1 narrowband is needed for eMTC (e.g. based on number of IoT devices within the cell). When LTE is re-farmed to NR, only the 1.4 MHz carrier is required for eMTC. However, the first N OFDM symbols (N=2-4 for 1.4 MHz and 1-3 for other bandwidth) remain unusable for eMTC carrier due to legacy design.

As shown in FIG. 2, which also depicts re-farming of LTE spectrum to (a) NR with eMTC carrier in-band and (b) separate NR and eMTC carriers, this time for where 2 narrowbands are needed for eMTC. In this situation, when LTE is re-farmed to NR, 3 MHz carrier is required for eMTC. In this case, the first N OFDM symbols as well as 3 PRBs remain unusable for eMTC carrier due to legacy design.

Deploying an eMTC carrier within NR carrier may be more desirable as opposed to deploying separate eMTC and NR carriers since NR does not support bandwidth smaller than 5 MHz. For instance, in FIG. 2, 10 MHz LTE carrier can be re-farmed to 10 MHz NR carrier with eMTC taking up 3 MHz, leaving 7 MHz to NR. However, if separate carriers are used, eMTC will take up 3 MHz while NR can only use 5 MHz, leaving 2 MHz unused. Furthermore, deploying an eMTC carrier within NR carrier also allow load-balancing so NR can use more spectrum when eMTC load is low.

In addition, if a low complexity UE is supported based on NR radio access technology, such an NR-IoT UE may also be dual mode with support for eMTC. In good radio conditions, an NR-IoT UE can transmit at high data rates (e.g. 100 Mbps), while in bad radio conditions (i.e. in coverage enhancement), it can switch to eMTC to transmit a small amount of information (e.g. location, status, diagnostic, etc.).

In any event, it can be seen from the above discussion that there would exist unusable time-frequency resources in an eMTC carrier when the LTE carrier is re-farmed for NR and LTE support is no longer needed. As such, this invention introduces standalone eMTC and support of NR-based IoT (NR-IoT) UE. This invention enhances eMTC to (a) use all available time-frequency resource for UEs envisioned by Rel-16 and beyond while minimizing any impact to legacy eMTC UEs, (b) support switching between NR and eMTC for NR-IoT dual-mode UE, and (c) minimize resource waste while maintaining the expected coverage and performance for legacy eMTC UEs.

Figure 3:
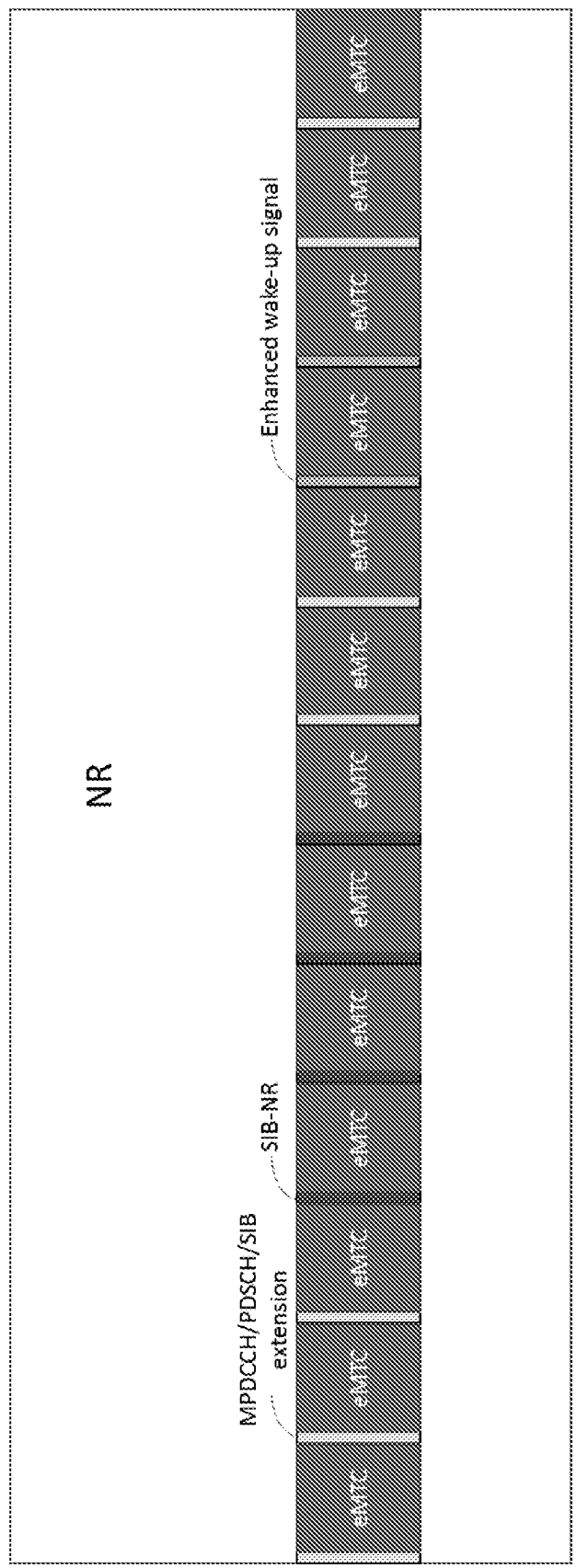
FIG. 3 is a schematic of an exemplary embodiment of a standalone eMTC deployment within NR in accordance with the present invention using all OFDM symbols in 1 narrowband.
Figure 4:
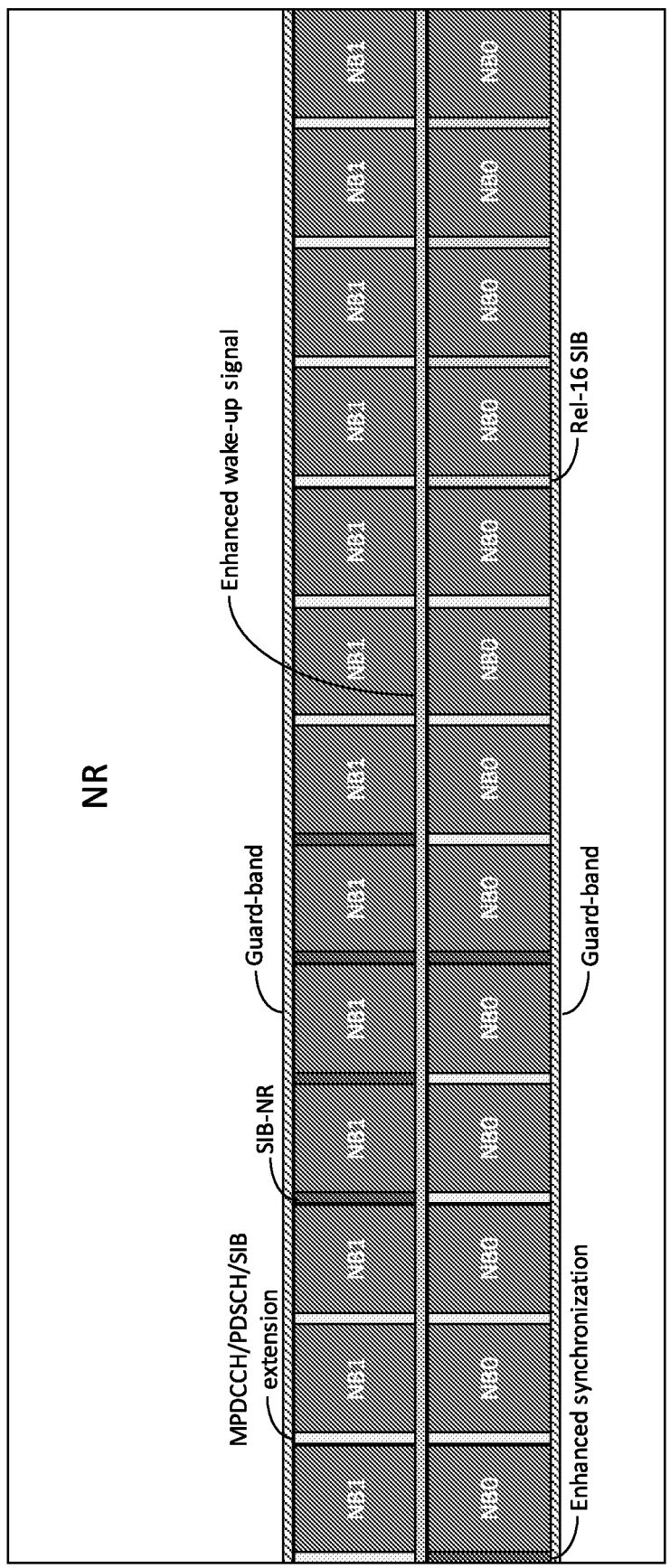
FIG. 4 is a schematic of an exemplary embodiment of a standalone eMTC deployment within NR in accordance with the present invention using all in 2 narrowbands.
Figure 5:
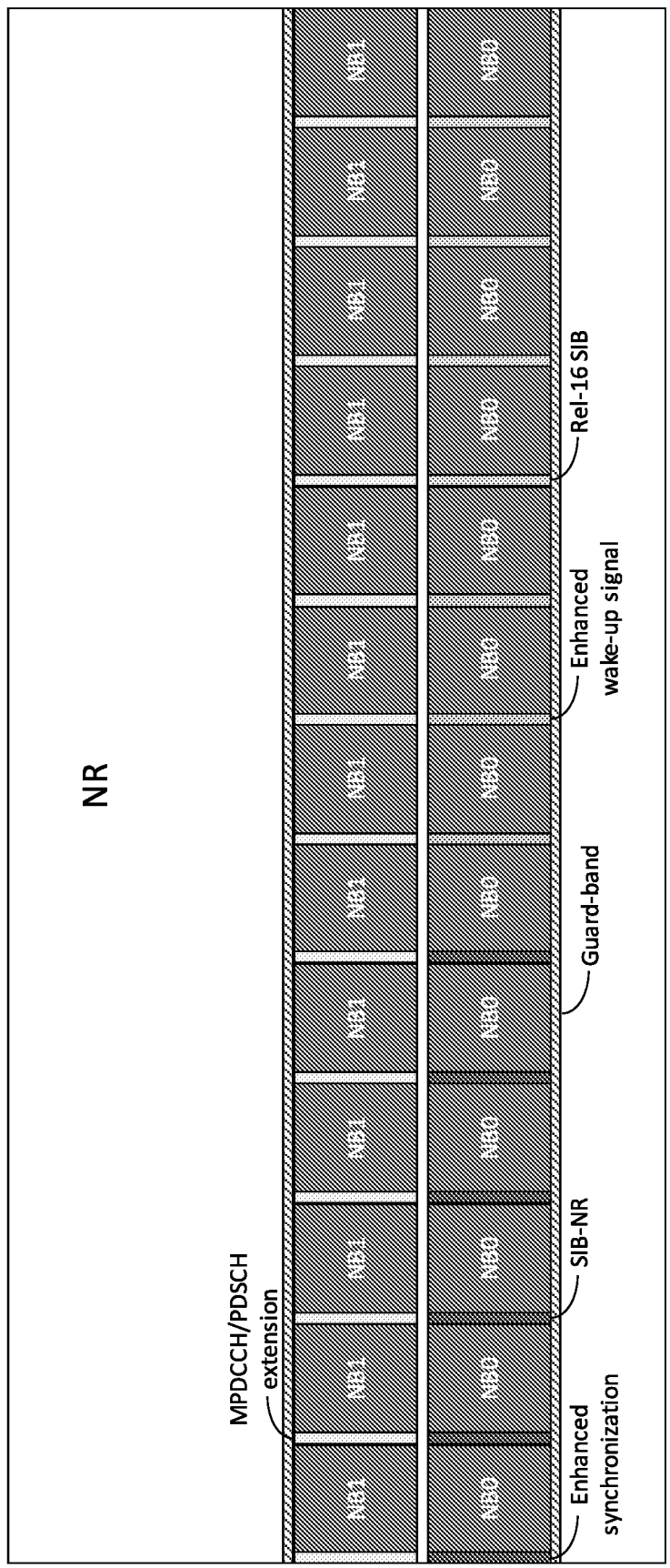
FIG. 5 is a schematic of another exemplary embodiment of a standalone eMTC deployment within NR in accordance with the present invention using all in 2 narrowbands.

FIG. 3, FIG. 4, and FIG. 5 show embodiments of the present invention for standalone eMTC deployment within NR using one, two, or all OFDM symbols, respectively, though all of these embodiments are similar in most respects.

An eNB will broadcast, in eMTC System Information Block (SIB1-BR) whether the unused symbols and PRBs available for use for a Rel-16 UE, such that they can be used for SIB-NR, enhanced wake-up signal, enhanced synchronization signals, or MPDCCH/PDSCH extension. A bitmap can be used to broadcast which subframes/symbols/PRBs are reserved for which purpose (as can be seen in FIG. 3 for example). Another alternative is the spare bits in MIB is to be used to indicate the number of available symbols for Rel-16 UE.

With this invention, we introduce a new SIB containing NR-related information (SIB-NR) which will be transmitted in the unused time-frequency region in certain subframes. In addition, a new SIB containing only Rel-16 related information elements can also be transmitted in the first N OFDM symbols of certain subframes.

The scheduling information for this SIB-NR will be given in SIB1. The scheduling information comprises TBS value, frequency domain allocation (narrowband index), and time domain allocation (start subframe, subframe offset, number of subframes, number of repetitions, in first N symbols or in symbols of data region).

Moreover, the SIB-NR may contain NR assistance information and/or NR coexistence information. The NR assistance information would be to help with fast switching from eMTC to NR. For example, NR subcarrier spacing, NR bandwidth part reserved for IoT, CORESET information, SSB information including physical layer cell ID, time location and measurement related information, (potential) subcarrier offset, and access barring. Examples of the NR coexistence information are time restriction (e.g. invalid subframes or symbols), frequency guard band, and power control restriction.

On a time-frequency region without SIB-NR, an enhanced wake-up signal can be transmitted. This enhanced wake-up signal is intended for UEs with a wake-up receiver. The UE monitors the wake-up signal to determine whether it should turn on its baseband unit for a specified number of subframes. This number may be either preconfigured or carried in the sequence itself. The enhanced wake-up signal can be a sequence but it may also carry a small amount of information. The enhanced wake-up signal may span between 1 and N symbols. For example, for a UE in coverage enhancement, a basic sequence may be repeated over N symbols. Note that this signal is different from Rel-15 wake-up signal, which is used by UE to check for the presence of paging.

On a time-frequency region without SIB-NR, enhanced synchronization signal, i.e., PSS, SSS, can be transmitted. The additional PSS/SSS can be transmitted in the same subframe as PSS/SSS.

On a time-frequency region without SIB-NR or on an enhanced wake-up signal or enhanced PSS/SSS, the MPDCCH, PDSCH, or SIB will be extended to occupy the first N OFDM symbols, preferably duplicate symbols with the same CRS pattern as first N OFDM symbols. With regard to MPDCCH, the MPDCCH symbols carried in the first N symbols are the repetition of the N symbols MPDCCH in data region of the subframe, such N symbols in the data region being repeated according to predefined rules. With regard to PDSCH and Rel-16 UE, the data symbols are mapped onto all symbols of the subframe.

FIG. 3 shows an example of a standalone eMTC using all OFDM symbols (1 narrowband), where the signals/channels are time-multiplexed together (e.g. according to a bit-map). The bit map can indicate which subframes are reserved for which purpose.

FIG. 4 shows an example of a standalone eMTC using all OFDM symbols (2 narrowbands), where the signals/channels are multiplexed in time and frequency together.

FIG. 5 shows an example of a standalone eMTC using all OFDM symbols (2 narrowbands), where new signals are in 1 narrowband while the other narrowband is simply used for MPDCCH/PDSCH extension.

Figure 6:
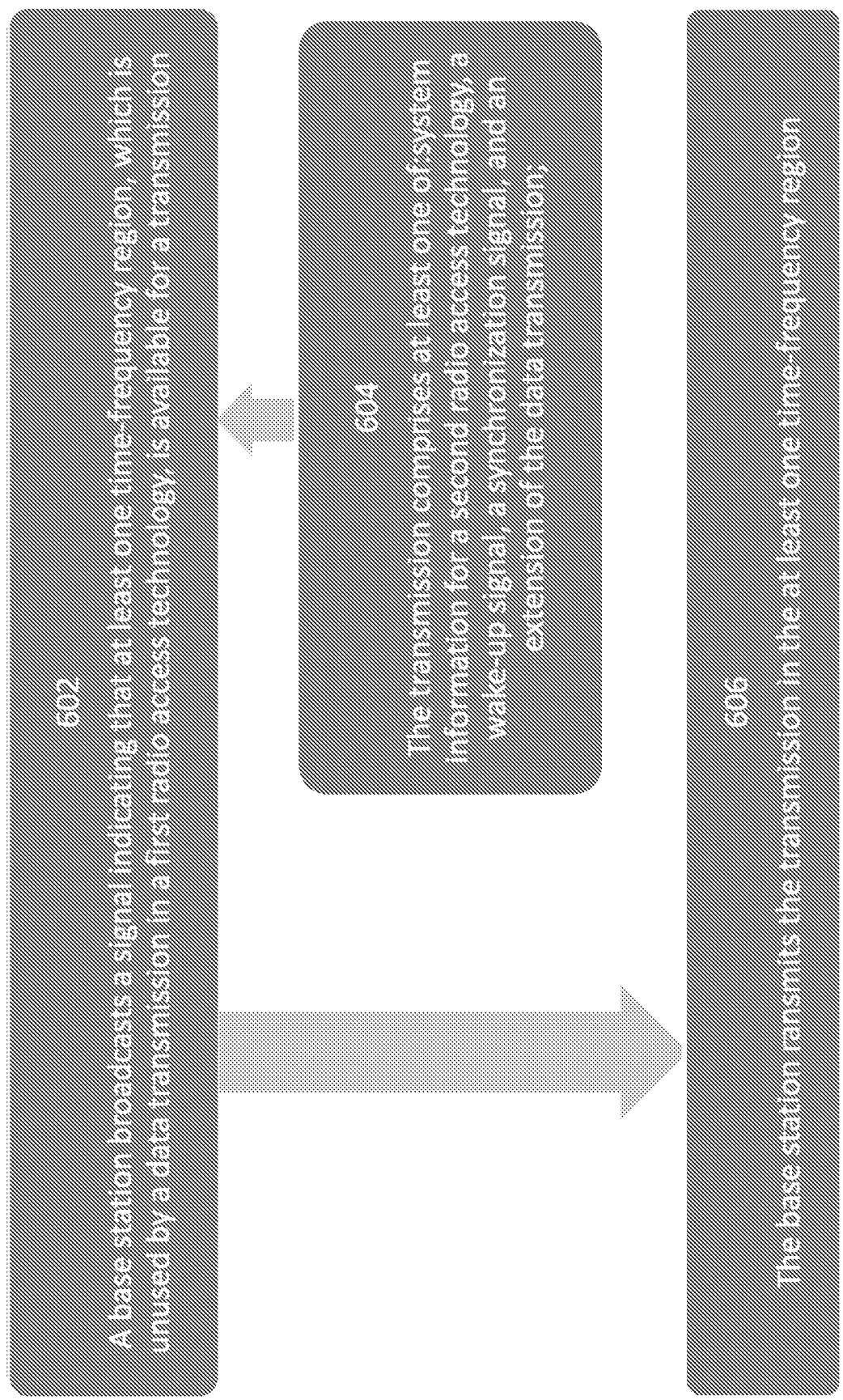
FIG. 6 is a logic flow diagram an exemplary method, a result of execution of computer program instructions embodied on a computer readable memory, functions performed by logic implemented in hardware, and/or interconnected means for performing functions in accordance with exemplary embodiment.

FIG. 6 is a logic flow diagram an exemplary method, a result of execution of computer program instructions embodied on a computer readable memory, functions performed by logic implemented in hardware, and/or interconnected means for performing functions in accordance with exemplary embodiment.

In block 602, base station broadcasts a signal indicating that at least one time-frequency region, which is unused by a data transmission in a first radio access technology, is available for a transmission. Block 604 defines that the transmission comprises at least one of: system information for a second radio access technology, a wake-up signal, a synchronization signal, and an extension of the data transmission. Block 606 shows that the base station transmits the transmission in the at least one time-frequency region.

An exemplary embodiment of the invention is a method that comprises broadcasting, by an eNB in eMTC, a System Information Block (SIB1-BR) indicating availability for use by a Rel-16 UE of unused symbols and PRBs, which can be used for SIB-NR, enhanced wake-up signal, enhanced synchronization signals, or MPDCCH/PDSCH extension. A bitmap can be used to broadcast which subframes/symbols/PRBs are reserved for which purpose.

Transmitting the newly introduced SIB-NR on this unused time-frequency region, wherein the SIB-NR comprises at least one of: NR assistance information, NR coexistence information, and NR related information.

Transmitting an enhanced wake-up signal on a time-frequency region without SIB-NR, wherein this enhanced wake-up signal is intended for UEs with wake-up receiver such that a UE monitoring the wake-up signal can determine whether it should turn on its baseband unit for a specified number of subframes.

Transmitting an enhanced synchronization signal on a time-frequency region without SIB-NR, i.e., PSS, SSS, where such an additional PSS/SSS can be transmitted in the same subframe as PSS/SSS.

On a time-frequency region without SIB-NR or enhanced wake-up signal or enhanced PSS/SSS, MPDCCH or PDSCH or SIB will be extended to occupy the first N OFDM symbols, preferably duplicating symbols with the same CRS pattern as unused symbols.

A response from a UE would vary depending on which of the listed signals is actually transmitted by the base-station in said time-frequency region. For example, if the transmitted signal is the wake-up signal, then the response of the UE would be to allow the UE to determine a need to turn on a baseband unit of the UE; if the transmitted signal is the SI for the $2^{nd}$ RAT, the response of the UE would depend on the exact contents of the SI, but it could for example be to use that information to accelerate switching to the 2nd RAT, or to improve coexistence with the $2^{nd}$ RAT [0042]; if the transmitted signal is the synchronization signal, the response could be that the UE uses it to speed up synchronization of its receiver to the BS, or to improve the accuracy of its receiver's synchronization to the BS; if the transmitted signal is an extension of the data transmission, the response of the UE would be to use it in the decoding of the data transmission. So, as can be seen there are myriad response that depend on the type of signal.

Note that the UE should does not reply to that transmission using the time-freq region for two reasons. First, the downlink (from BS to UE) and uplink (from UE to BS) use entirely different time-frequency regions; therefore the UE cannot transmit anything in the same time-frequency region; Second, the transmissions themselves do not demand a transmitted response; as explained in detail above, the four possible transmissions mentioned are used to improve the configuration or synchronisation or reception at the UE.

Figure 7:
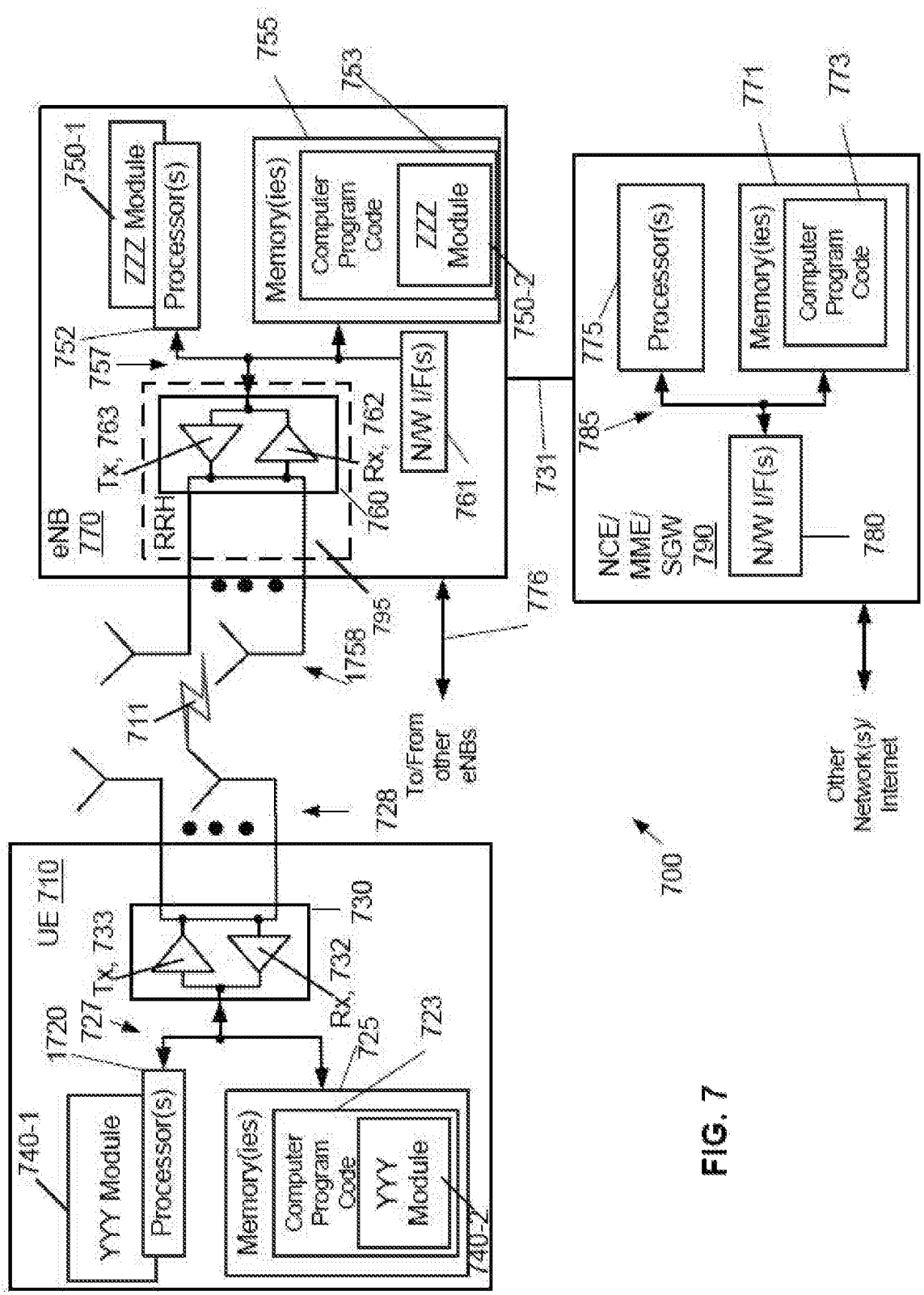
FIG. 7 is a block diagram of an exemplary system in which the exemplary embodiments may be practiced.

FIG. 7 presents a block diagram of one possible and non-limiting exemplary system in which the exemplary embodiments may be practiced. In FIG. 7, a user equipment (UE) 710 is in wireless communication with a wireless network 700. A UE is a wireless, typically mobile device that can access a wireless network. The UE 710 includes one or more processors 720, one or more memories 725, and one or more transceivers 730 interconnected through one or more buses 727. Each of the one or more transceivers 730 includes a receiver, Rx, 732 and a transmitter, Tx, 733. The one or more buses 727 may be address, data, or control buses, and may include any interconnection mechanism, such as a series of lines on a motherboard or integrated circuit, fiber optics or other optical communication equipment, and the like. The one or more transceivers 730 are connected to one or more antennas 728. The one or more memories 725 include computer program code 723. The UE 710 includes a YYY module 740, comprising one of or both parts 740-1 and/or 740-2, which may be implemented in a number of ways. The YYY module 740 may be implemented in hardware as YYY module 740-1, such as being implemented as part of the one or more processors 720. The YYY module 740-1 may be implemented also as an integrated circuit or through other hardware such as a programmable gate array. In another example, the YYY module 740 may be implemented as YYY module 740-2, which is implemented as computer program code 723 and is executed by the one or more processors 720. For instance, the one or more memories 725 and the computer program code 723 may be configured to, with the one or more processors 720, cause the user equipment 710 to perform one or more of the operations as described herein. The UE 710 communicates with gNB 770 via a wireless link 711.

The base station 770 (which in the shown embodiment is a gNB or NR/5G Node B but possibly an evolved NodeB for LTE, long term evolution, but could be any similar access point to a wireless network) that provides access by wireless devices such as the UE 710 to the wireless network 700. The gNB 770 includes one or more processors 752, one or more memories 755, one or more network interfaces (N/W I/F(s)) 761, and one or more transceivers 760 interconnected through one or more buses 757. Each of the one or more transceivers 760 includes a receiver, Rx, 762 and a transmitter, Tx, 763. The one or more transceivers 760 are connected to one or more antennas 758. The one or more memories 755 include computer program code 753. The gNB 770 includes a ZZZ module 750, comprising one of or both parts 750-1 and/or 750-2, which may be implemented in a number of ways. The ZZZ module 750 may be implemented in hardware as ZZZ module 750-1, such as being implemented as part of the one or more processors 752. The ZZZ module 750-1 may be implemented also as an integrated circuit or through other hardware such as a programmable gate array. In another example, the ZZZ module 750 may be implemented as ZZZ module 750-2, which is implemented as computer program code 753 and is executed by the one or more processors 752. For instance, the one or more memories 755 and the computer program code 753 are configured to, with the one or more processors 752, cause the gNB 770 to perform one or more of the operations as described herein. The one or more network interfaces 761 communicate over a network such as via the links 776 and 731. Two or more gNBs 770 communicate using link 778, while the gNB can communicate with other entities via link 776, where both link 776, sand 778 may be wired or wireless or both and may implement, e.g., an X2 interface.

The one or more buses 757 may be address, data, or control buses, and may include any interconnection mechanism, such as a series of lines on a motherboard or integrated circuit, fiber optics or other optical communication equipment, wireless channels, and the like. For example, the one or more transceivers 760 may be implemented as a remote radio head (RRH) 795, with the other elements of the gNB 770 being physically in a different location from the RRH, and the one or more buses 757 could be implemented in part as fiber optic cable to connect the other elements of the gNB 770 to the RRH 795.

It is noted that description herein indicates that "cells" perform functions, but it should be clear that the eNB that forms the cell would perform the functions. The cell makes up part of an eNB. That is, there can be multiple cells per eNB. For instance, there could be three cells for a single eNB carrier frequency and associated bandwidth, each cell covering one-third of a 360-degree area so that the single eNB's coverage area covers an approximate oval or circle. Furthermore, each cell can correspond to a single carrier and an eNB may use multiple carriers. So if there are three 120-degree cells per carrier and two carriers, then the eNB has a total of 6 cells.

The wireless network 700 may include a network control element (NCE) 790 that may include MME (Mobility Management Entity)/SGW (Serving Gateway) functionality, and which provides connectivity with a further network, such as a telephone network and/or a data communications network (e.g., the Internet). The gNB 770 is coupled via a link 731 to the NCE 790. The link 731 may be implemented as, e.g., an S1 interface. The NCE 790 includes one or more processors 775, one or more memories 771, and one or more network interfaces (N/W I/F(s)) 780, interconnected through one or more buses 785. The one or more memories 771 include computer program code 773. The one or more memories 771 and the computer program code 773 are configured to, with the one or more processors 775, cause the NCE 790 to perform one or more operations.

The wireless network 700 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 752 or 775 and memories 755 and 771, and also such virtualized entities create technical effects.

The computer readable memories 725, 755 and 771 may be of any type suitable to the local technical environment and may be implemented using any suitable data storage technology, such as semiconductor based memory devices, flash memory, magnetic memory devices and systems, optical memory devices and systems, fixed memory and removable memory. The processors 720, 752, and 775 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 710 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, as in FIG. 7 for example. A computer-readable medium may comprise a computer-readable storage medium (e.g., memories 725, 755, 771 or other device) that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). In the future the system might also employ edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as standalone apparatuses communicating with each other via a radio path or via a wired connection or they may be located in a same entity communicating via a wired connection.

Without in any way limiting the scope, interpretation, or application of the claims appearing below, an advantage or technical effect of one or more of the exemplary embodiments disclosed herein is that instead of simply reusing the first N OFDM symbols for MPDCCH and PDSCH, the current invention will use this to transmit SIB-NR, enhanced wake up signal, or enhanced synchronization signal. This is information that is only related to Rel-16 UE and transmitted on a region that only Rel-16 UE can use. Therefore, this allows the introduction of new functionality without any impact to legacy UEs or system performance.

An exemplary embodiment of the present invention, which can be referred to as item 1, is a method comprising: broadcasting a signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; transmitting, by the base station, the transmission in the at least one time-frequency region.

Another exemplary embodiment of the present invention, which can be referred to as item 2, is the method of item 1, wherein a bitmap is used to indicate which time-frequency regions are available for which purpose.

Another exemplary embodiment of the present invention, which can be referred to as item 3, is the method of item 1, wherein the system information for the second radio access technology comprises at least one of: information to assist access to the second radio access technology, information to facilitate coexistence between the first and second radio access technologies, and other information related to the second radio access technology.

Another exemplary embodiment of the present invention, which can be referred to as item 4, is the method of item 1, wherein the wake-up signal, detectable by a UE, allows the UE to determine a need to turn on a baseband unit of the UE.

Another exemplary embodiment of the present invention, which can be referred to as item 5, is the method of item 1, wherein the synchronization signal is transmitted in a same subframe as a further synchronization signal.

Another exemplary embodiment of the present invention, which can be referred to as item 6, is the method of item 1, wherein the system information for a second radio access technology, the wake-up signal, the synchronization signal, or the extension of the data transmission, occupies a first number of OFDM symbols.

Another exemplary embodiment of the present invention, which can be referred to as item 7, is the method of item 1, wherein extension of the data transmission at least include the downlink control channel for data transmission, the downlink data channel, and the system information.

Another exemplary embodiment of the present invention, which can be referred to as item 8, is the method of item 7, wherein the extension of the downlink control channel for data transmission or extension of the system information transmission in a first one of the OFDM symbols contains a reference signal in at least one resource element in the frequency domain, and wherein the extension of the downlink control channel for data transmission or extension of the system information transmission replicates the data transmission in a later OFDM symbol which contains a reference signal in the same at least one resource elements in the frequency domain.

Another exemplary embodiment of the present invention, which can be referred to as item 9, is the method of item 7, wherein the extension of the downlink data channel transmission in a first one of the OFDM symbols, the data symbols in the downlink data channel are mapping onto all symbols of the subframe.

Another exemplary embodiment of the present invention, which can be referred to as item 10, is a method comprising: receiving by a UE a broadcast signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; receiving, by the UE, the transmission in the at least one time-frequency region.

Another exemplary embodiment of the present invention, which can be referred to as item 11, is an apparatus comprising: at least one processor and at least one memory including computer program code, wherein the at least one memory and the computer code are configured, with the at least one processor, to cause the apparatus to at least perform the following: broadcasting a signal indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; transmitting the transmission in the at least one time-frequency region.

Another exemplary embodiment of the present invention, which can be referred to as item 12, is the apparatus of item 11, wherein a bitmap is used to indicate which time-frequency regions are available for which purpose.

Another exemplary embodiment of the present invention, which can be referred to as item 13, is the apparatus of item 11, wherein the system information for the second radio access technology comprises at least one of: information to assist access to the second radio access technology, information to facilitate coexistence between the first and second radio access technologies, and other information related to the second radio access technology.

Another exemplary embodiment of the present invention, which can be referred to as item 14, is the apparatus of item 11, wherein the wake-up signal, detectable by a UE, allows the UE to determine a need to turn on a baseband unit of the UE.

Another exemplary embodiment of the present invention, which can be referred to as item 15, is the apparatus of item 11, wherein the synchronization signal is transmitted in a same subframe as a further synchronization signal.

Another exemplary embodiment of the present invention, which can be referred to as item 16, is the apparatus of item 11, wherein the system information for a second radio access technology, the wake-up signal, the synchronization signal, or the extension of the data transmission, occupies a first number of OFDM symbols.

Another exemplary embodiment of the present invention, which can be referred to as item 17, is the apparatus of item 11, wherein extension of the data transmission at least include the downlink control channel for data transmission, the downlink data channel, and the system information.

Another exemplary embodiment of the present invention, which can be referred to as item 18, is the apparatus of item 17, wherein the extension of the downlink control channel for data transmission or extension of the system information transmission in a first one of the OFDM symbols contains a reference signal in at least one resource element in the frequency domain, and wherein the extension of the downlink control channel for data transmission or extension of the system information transmission replicates the data transmission in a later OFDM symbol which contains a reference signal in the same at least one resource elements in the frequency domain.

Another exemplary embodiment of the present invention, which can be referred to as item 19, is the apparatus of item 17, wherein the extension of the downlink data channel transmission in a first one of the OFDM symbols, the data symbols in the downlink data channel are mapping onto all symbols of the subframe.

Another exemplary embodiment of the present invention, which can be referred to as item 20, is a computer program product embodied on a non-transitory computer-readable medium in which a computer program is stored that, when being executed by a computer, is configured to provide instructions to control or carry out: broadcasting a signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; transmitting, by the base station, the transmission in the at least one time-frequency region.

Another exemplary embodiment of the present invention, which can be referred to as item 21, is a computer program comprising code for broadcasting a signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; and code for transmitting, by the base station, the transmission in the at least one time-frequency region.

Another exemplary embodiment of the present invention, which can be referred to as item 22, is an apparatus comprising means for broadcasting a signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; and means for transmitting, by the base station, the transmission in the at least one time-frequency region.

Another exemplary embodiment of the present invention, which can be referred to as item 23, is an apparatus comprising: at least one processor and at least one 5 memory including computer program code, wherein the at least one memory and the computer code are configured, with the at least one processor, to cause the apparatus to at least perform the following: receiving by a UE a broadcast signal, by a base station, indicating that at least one time-frequency region, unused by a data transmission in a first radio access technology, is available for a transmission, wherein the transmission comprises 10 at least one of: system information for a second radio access technology, a wake-up signal, a synchronization signal, and an extension of the data transmission; receiving, by the UE, the transmission in the at least one time-frequency region.

Another exemplary embodiment of the present invention, which can be referred to as item 24, is an apparatus comprising: means for receiving by a UE a broadcast signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; and means for receiving, by the UE, the transmission in the at least one time-frequency region.

Another exemplary embodiment of the present invention, which can be referred to as item 25, is a computer program comprising: code for receiving by a UE a broadcast signal, by a base station, indicating that at least one time-frequency region, unused by a data transmission in a first radio access technology, is available for a transmission, wherein the transmission comprises at least one of: system information for a second radio access technology, a wake-up signal, a synchronization signal, and an extension of the data transmission; and code for receiving, by the UE, the transmission in the at least one time-frequency region.

Although various aspects of the invention are set out in the independent claims, other aspects of the invention comprise other combinations of features from the described embodiments and/or the dependent claims with the features of the independent claims, and not solely the combinations explicitly set out in the claims. If desired, the different functions discussed herein may be performed in a different order and/or concurrently with each other. Furthermore, if desired, one or more of the above-described functions may be optional or may be combined.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:

1. A method comprising:
   broadcasting a signal, with a base station and in enhanced Machine Type Communication (eMTC) System Information Block, indicating that at least one time-frequency region, unused by a data transmission in a first radio access technology, is available for a transmission, wherein the first radio access technology comprises Long Term Evolution (LTE), and wherein the transmission comprises:
system information for a second radio access technology, wherein the second radio access technology comprises New Radio (NR),
a wake-up signal,
a synchronization signal, and
an extension of the data transmission; and
transmitting, with the base station, the transmission in the at least one time-frequency region.

2. The method of claim 1, wherein a bitmap is used to indicate which time-frequency regions are available for which purpose.

3. The method of claim 1, wherein the system information for the second radio access technology comprises at least one of:
information to assist access to the second radio access technology,
information to facilitate coexistence between the first and second radio access technologies, or
other information related to the second radio access technology.

4. The method of claim 1, wherein the wake-up signal, detectable with a user equipment, allows the user equipment to determine a need to turn on a baseband unit of the user equipment.

5. The method of claim 1, wherein the synchronization signal is transmitted in a same subframe as a further synchronization signal.

6. The method of claim 1, wherein the system information for the second radio access technology, the wake-up signal, the synchronization signal, or the extension of the data transmission, occupies a first number of orthogonal frequency division multiplexing symbols.

7. The method of claim 1, wherein the extension of the data transmission at least includes:
extension of a downlink control channel for the data transmission,
extension of a downlink data channel transmission, and
extension of a system information transmission.

8. The method of claim 7, wherein the extension of the downlink control channel for the data transmission or the extension of the system information transmission in a first one of orthogonal frequency division multiplexing symbols contains a reference signal in at least one resource element in a frequency domain, and wherein the extension of the downlink control channel for the data transmission or the extension of the system information transmission replicates the data transmission in a later orthogonal frequency division multiplexing symbol which contains the reference signal in a same at least one resource element in the frequency domain.

9. The method of claim 7, wherein for the extension of the downlink data channel transmission in a first one of orthogonal frequency division multiplexing symbols, data symbols in a downlink data channel are mapping onto all symbols of a subframe.

10. A method comprising:
receiving, in enhanced Machine Type Communication (eMTC) System Information Block, with a user equipment a broadcast signal from a base station, indicating that at least one time-frequency region, unused by a data transmission in a first radio access technology, is available for a transmission, wherein the first radio access technology comprises Long Term Evolution (LTE), and wherein the transmission comprises:
system information for a second radio access technology, wherein the second radio access technology comprises New Radio (NR),
a wake-up signal,
a synchronization signal, and
an extension of the data transmission; and
receiving, with the user equipment, the transmission in the at least one time-frequency region.

11. An apparatus comprising:
at least one processor and at least one memory storing instructions that when executed by the at least one processor cause the apparatus at least to perform:
broadcasting, with a base station and in enhanced Machine Type Communication (eMTC) System Info'illation Block, a signal indicating that at least one time-frequency region, unused by a data transmission in a first radio access technology, is available for a transmission, wherein the first radio access technology comprises Long Term Evolution (LTE), and wherein the transmission comprises:
system information for a second radio access technology, wherein the second radio access technology comprises New Radio (NR),
a wake-up signal,
a synchronization signal, and
an extension of the data transmission; and
transmitting the transmission in the at least one time-frequency region.

12. The apparatus of claim 11, wherein a bitmap is used to indicate which time-frequency regions are available for which purpose.

13. The apparatus of claim 11, wherein the system information for the second radio access technology comprises at least one of:
information to assist access to the second radio access technology,
information to facilitate coexistence between the first and second radio access technologies, or
other information related to the second radio access technology.

14. The apparatus of claim 11, wherein the wake-up signal, detectable with a user equipment, allows the user equipment to determine a need to turn on a baseband unit of the user equipment.

15. The apparatus of claim 11, wherein the synchronization signal is transmitted in a same subframe as a further synchronization signal.

16. The apparatus of claim 11, wherein the system information for the second radio access technology, the wake-up signal, the synchronization signal, or the extension of the data transmission, occupies a first number of orthogonal frequency division multiplexing symbols.

17. The apparatus of claim 11, wherein the extension of the data transmission at least includes extension of a downlink control channel for the data transmission, extension of a downlink data channel transmission, and extension of a system information transmission.

18. The apparatus of claim 17, wherein the extension of the downlink control channel for the data transmission or the extension of the system information transmission in a first one of orthogonal frequency division multiplexing symbols contains a reference signal in at least one resource element in a frequency domain, and wherein the extension of the downlink control channel for the data transmission or the extension of the system information transmission replicates the data transmission in a later orthogonal frequency division multiplexing symbol which contains the reference signal in a same at least one resource element in the frequency domain.

19. The apparatus of claim 17, wherein for the extension of the downlink data channel transmission in a first one of orthogonal frequency division multiplexing symbols, data symbols in a downlink data channel are mapping onto all symbols of a subframe.

20. The apparatus of claim 11, wherein the at least one time-frequency region is unused by the data transmission in the first radio access technology because symbols in the at least one time-frequency region are reserved for one or more specific purposes in the first radio access technology.

* * * * *